US012629620B2

(12) United States Patent (10) Patent No.: US 12,629,620 B2
Aarseth (45) Date of Patent: May 19, 2026

(54) BI-DIRECTIONAL FILTER

(71) Applicant: COMBIPRO AS, Asker (NO)

(72) Inventor: Finn Aarseth, Asker (NO)

(73) Assignee: COMBIPRO AS, Asker (NO)

( * ) Notice: Subject to any disclaimer, the term of this patent is extended or adjusted under 35 U.S.C. 154(b) by 300 days.

(21) Appl. No.: 18/263,780

(22) PCT Filed: Jan. 24, 2022

(86) PCT No.: PCT/EP2022/051433
§ 371 (c)(1),
(2) Date: Aug. 1, 2023

(87) PCT Pub. No.: WO2022/161896
PCT Pub. Date: Aug. 4, 2022

(65) Prior Publication Data
US 2024/0066447 A1 Feb. 29, 2024

(30) Foreign Application Priority Data

Feb. 1, 2021 (NO) .................................... 20210125

(51) Int. Cl.
B01D 33/21 (2006.01)
B01D 17/02 (2006.01)
(Continued)

(52) U.S. Cl.
CPC ....... B01D 36/045 (2013.01); B01D 17/0217 (2013.01); B01D 33/21 (2013.01);
(Continued)

(58) Field of Classification Search
CPC .. B01D 36/045; B01D 17/0217; B01D 33/21; B01D 33/37; B01D 19/0052;
(Continued)

(56) References Cited

U.S. PATENT DOCUMENTS 3,289,841 A * 12/1966 Quinting ................ B01D 35/15
55/420
3,730,343 A 5/1973 Pause et al.
(Continued)

FOREIGN PATENT DOCUMENTS

CA 2999661 A1 * 5/2017 ............. B01D 33/21
CN 203196472 U 9/2013
(Continued)

OTHER PUBLICATIONS

English translation of CN_107485906A, Dec. 19, 2017. (Year: 2017).*
(Continued)

*Primary Examiner* — Joseph W Drodge
(74) *Attorney, Agent, or Firm* — Osha Bergman Watanabe & Burton LLP

(57) ABSTRACT

A bi-directional filter includes an outer housing and a filter assembly unit. The outer housing is provided with one inlet for contaminated fluid and at least one outlet. The filter assembly unit includes at least one separation void for contaminated fluid. The filter assembly unit, at least one separation void, and the outer housing provide an outer dead end and an inner dead end within the bi-directional filter. The filter assembly unit is connected to a drive unit through a shaft.

11 Claims, 10 Drawing Sheets

(51) Int. Cl.

| | | |
|---|---|---|
| *B01D 33/37* | (2006.01) | |
| *B01D 36/04* | (2006.01) | |
| *B01D 63/08* | (2006.01) | |
| *B01D 63/16* | (2006.01) | |
| *B03C 1/30* | (2006.01) | |
| *B04B 7/16* | (2006.01) | |

(52) U.S. Cl.
CPC .......... *B01D 33/37* (2013.01); *B01D 63/082* (2013.01); *B01D 63/16* (2013.01); *B03C 1/30* (2013.01); *B04B 7/16* (2013.01)

(58) Field of Classification Search
CPC ............ B01D 21/0009; B01D 21/0012; B01D 21/0045; B01D 21/2411; B01D 21/262; B01D 33/15; B01D 33/215; B01D 33/39; B01D 33/41; B01D 33/74; B01D 33/801; B01D 63/082; B01D 63/16; B03C 1/30; B03C 1/00; B03C 1/023; B04B 7/16; B04B 1/04; B04B 1/00
See application file for complete search history.

(56) References Cited

U.S. PATENT DOCUMENTS

| | | | | |
|---|---|---|---|---|
| 4,209,127 A | | 6/1980 | Khapaev | |
| 4,975,188 A | * | 12/1990 | Brunsell | ................. B01D 33/21 210/324 |
| 5,707,517 A | * | 1/1998 | Rolchigo | ............... B01D 63/16 210/324 |
| 6,168,724 B1 | * | 1/2001 | Hurwitz | ................. B01D 29/41 210/330 |
| 7,699,979 B2 | | 4/2010 | Li et al. | |
| 8,636,906 B2 | | 1/2014 | Stein | |
| 2003/0146146 A1 | | 8/2003 | Mackel et al. | |
| 2004/0029696 A1 | | 2/2004 | Mackel et al. | |
| 2004/0251214 A1 | * | 12/2004 | Adams | ................... B01D 35/06 210/402 |
| 2005/0029183 A1 | | 2/2005 | Sternad et al. | |
| 2006/0186034 A1 | * | 8/2006 | Harms | ................... B01D 33/72 210/331 |

| | | | | |
|---|---|---|---|---|
| 2013/0133250 A1 | | 5/2013 | Chan | |
| 2017/0349469 A1 | | 12/2017 | Mccutchen | |
| 2018/0021714 A1 | | 1/2018 | Parikh et al. | |
| 2019/0263678 A1 | | 8/2019 | Nazzer | |

FOREIGN PATENT DOCUMENTS

| | | | | |
|---|---|---|---|---|
| CN | 107485906 A | * | 12/2017 | ......... B01D 29/6476 |
| CN | 111495590 A | | 8/2020 | |
| DE | 102013000596 A1 | | 7/2014 | |
| EP | 1502638 A1 | * | 2/2005 | ............. B01D 33/52 |
| GB | 1027293 A | | 4/1966 | |
| JP | 2009-214053 A | | 9/2009 | |
| NO | 20181290 A1 | | 4/2020 | |
| RU | 2161537 C1 | | 1/2001 | |
| WO | 2008/055371 A2 | | 5/2008 | |
| WO | 2020/070336 A1 | | 4/2020 | |

OTHER PUBLICATIONS

Machine translation of EP1502638A1, 2005-02-02. (Year: 2005).*
International Search Report issued in PCT/EP2022/051433 on Apr. 12, 2022 (6 pages).
Written Opinion of the International Searching Authority issued in PCT/EP2022/051433 on Apr. 12, 2022 (9 pages).
Norwegian Search Report issued in No. 20210125, mailed on Aug. 27, 2021 (2 pages).
J. Lindner et al.; "Magnetically enhanced centrifugation for industrial use"; Upscaling of Bio-Nano-Processes; Lecture Notes in Bioengineering; 2014 (16 pages).
Venugopal et al.; "Controlling Dielectric and Magnetic Properties of PVdF/Magnetite Nanocomposite Fiber Webs"; Hindawi Publishing Corporation; International Journal of Polymer Science; vol. 2014, Article ID 102946; Apr. 27, 2014 (10 pages).
Sedighi et al.; "Fabrication of electrically conductive superparamagnetic fabric with microwave attenuation, antibacterial properties and UV protection using PEDOT/magnetite nanoparticles"; Materials & Design; vol. 160; pp. 34-47; 2018 (14 pages).
T. Varzakas et al.; "Food Engineering Handbook: Food Process Engineering"; 1st Edition; CRC Press; 2014 (654 pages).

* cited by examiner

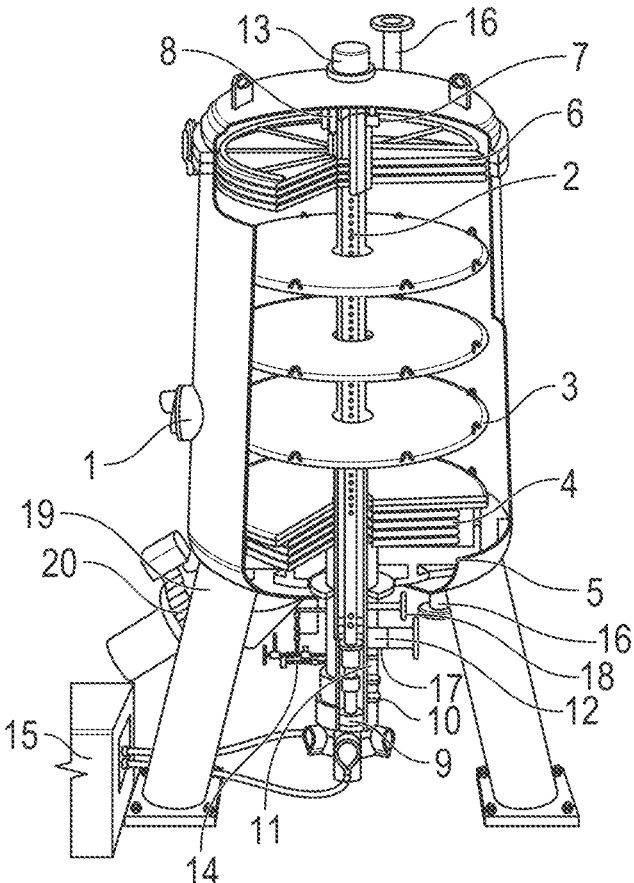

| | | | |
|---|---|---|---|
| ① | Filter vessel with sight glass | ⑪ | Seal arrangement (bearing housing) |
| ② | Hollow filter shaft | ⑫ | Seal arrangement (distribution housing) |
| ③ | Filter plate | ⑬ | Upper bearing housing |
| ④ | Scavenge plate | ⑭ | Seal flush system |
| ⑤ | Support ring with discharge aids | ⑮ | Pump unit for hydrostatic drive or other drives |
| ⑥ | Spider ring with deflector plate | ⑯ | Feed intlet |
| ⑦ | Thrust collar | ⑰ | Filtrate outlet |
| ⑧ | Compression flange | ⑱ | Scavenge filtrate outlet |
| ⑨ | Drive shaft with bearing housing and hydraulic motor | ⑲ | Heel drainage |
| ⑩ | Protector sleeve | ⑳ | Cake discharge |

Fig. 2

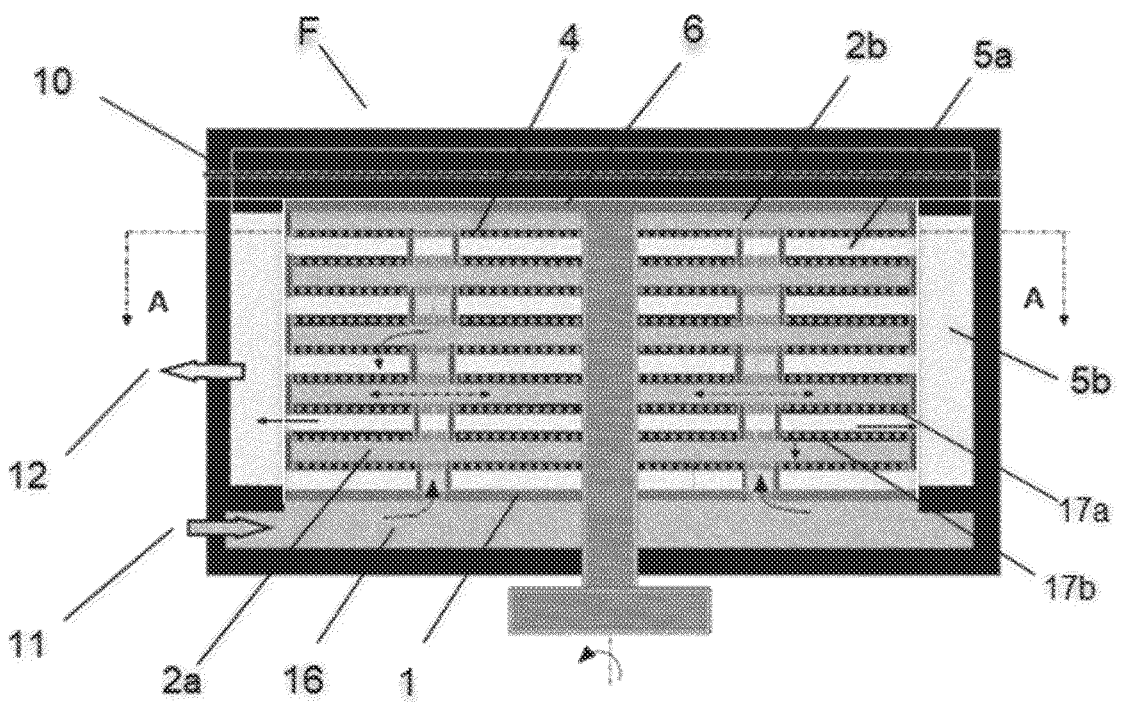
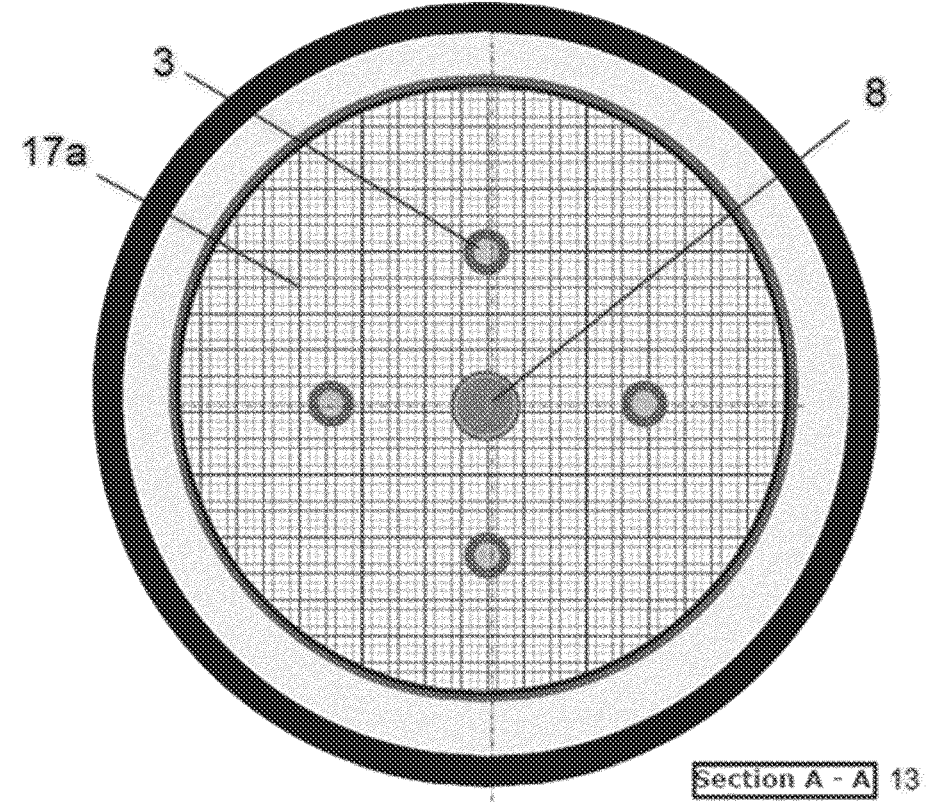
Fig.13

BI-DIRECTIONAL FILTER

The present invention relates to a device for fluid purification, and more specifically the present invention relates to a bi-directional filter for fluid purification, where a combination of magnetic particles and centrifugal forces are used to control contaminating particles flow paths towards inner and outer peripheries (dead ends/end stops) of a circular separation void and tangential filtering provided in the bi-directional filter. Subject disposal at dead ends/end stops will be compacted and caked by acting forces. Local apparent fluid from the cacking process will crossflow and incrementally load the filter to be locally fouled and blocked, leaving a remaining flow path filter surface area open for a free filtering. An optimal utilization of filter storage capabilities is thus achieved prior to renewal.

The present invention relates also to a method and a system for fluid purification, where the system comprises one or more of the following elements: an ecological designed cartridge including the bi-directional filter, recycling of materials from the cartridge including the bi-directional filter, storage of the cartridge including the bi-directional filter and subscription and support arrangements for the cartridge including the bi-directional filter.

As used herein, the expression "fluid purification" should be understood to be an act or process of rendering something pure, i.e. clean of undesired elements and/or pollution from the fluid, the fluid being a liquid and/or gas.

BACKGROUND

By use of so-called magnetic nanoparticles (MNP), that are functionalized for bonding to targeted contamination dissolved in a fluid, the contamination can be controlled by external applied electrostatic and magnetic fields induced onto the MNP, and thus interact with the balance of centrifugal forced fluid flow for disposal.

Especially small targeted particles with specific weight close to the fluid and with no active centrifugal force, as well as other particles which do not interact with electrostatic purification, can thus be controlled by MNP and Electrostatic (ES) and/or Electromagnetic (EM) interaction for movements in desired directions.

Oscillated interaction will stimulate a relative movement as a function of viscous thinning. By periodically halting or staggering said oscillation at peak amplitudes, small particles will remain in its new orbit and can thus systematically build an enhanced centrifugal forced separation.

CN 111495590 relates to an air treatment device and an air purification method. The air treatment device comprises an electrostatic generator, a liquid spraying structure and an electric field structure, wherein the liquid spraying structure comprises a plurality of filter plates arranged at intervals, a flow channel allowing air to circulate is formed between every two adjacent filter plates, hydrophilic coatings are arranged on the surfaces of the filter plates, and the filter plates can conduct electricity and are electrically connected with the electrostatic generator; the electric field structure is located on the downstream of the liquid spraying structure and electrically connected with the electrostatic generator. When air passes through a flow channel between two adjacent filter plates, water vapor in the air can be in contact with the hydrophilic coatings on the surfaces of the filter plates to be adsorbed so that the air is dried. When the electrostatic generator is communicated with circuit between the filter plate and the electric field structure, the surface of the filter plate has static electricity, and charged particles are formed after air is in contact with the filter plate and adsorbed in the electric field structure under the action of electric field force so as to purify the air.

CN203196472 relates to a dust collection device with an electromagnetic coil filter screen comprises a filter screen, a support, injection pipes and a compressed air pipe, wherein the support is arranged in a suction pipeline and located at the upper part of the filter screen; a plurality of rows of injection pipes are evenly distributed and fixed in the support; the filter screen is composed of a plurality of electromagnetic coils which are transversely arranged at equal intervals; one end of each injection pipe is sealed, while the other end of the injection pipe is communicated with the compressed air pipe. The online dust collection device with the electromagnetic coil filter screen has the advantages that the electromagnetic coils are combined to form the filter screen, the electromagnetic coils are electrified to generate magnetic force so as to absorb iron powder, and then power is cut off and the injection pipes are used for sweeping the iron powder, and therefore, the dead zone of sweeping is greatly reduced, the effect of sweeping is improved, the surface of the filter screen is kept clean and smooth, and the flow field of air is guaranteed not to cause reduction of suction efficiency due to blockage of the filter screen; as a result, continuous efficient dust collection of the dust collection device is realized, the labor intensity of workers is reduced and the efficiency of suction is well guaranteed.

JP2009214053 relates to a magnetic separator magnetically attracts and separates a non-magnetic material by adding magnetic particles into a non-magnetic material-containing liquid to be treated, causing the magnetic particles to adhere to the non-magnetic material and magnetically attracting the magnetized non-magnetic material by a magnetic filter. A magnetic separation part is installed in a pipe for the liquid to be treated into which the magnetic particles are added, and is divided into a magnetically attracting section, a magnetization section, and a magnetic particle remixing section from the downstream side. In the pipe, a plurality of the magnetic filters are axially installed side by side, and a moving means for moving the magnetic filters toward the upstream side is installed. The magnetic particles magnetically attracted to the magnetic filters in the magnetic attraction section are separated from the magnetic filters in the magnetic particle remixing section to migrate into the liquid to be treated, and the migrating magnetic particles are made to re-adhere to the non-magnetic material. The moving velocity of the magnetic particles migrating in the liquid to be treated in the magnet-carrying section is made higher than that of the non-magnetic material in the liquid to be treated, thereby facilitating the adhesion of the magnetic particles to the non-magnetic material.

SUMMARY OF THE INVENTION

The present invention relates to a device and method and process for fluid purification, where functionalized MNP may be bonded to targeted contamination dissolved in a liquid or gaseous fluid, whereafter the targeted contamination and the bonded nano particles may be subjected to electromagnetic and/or electrostatic field force(s) directed with the axis of a centrifugal separator forced flow for disposal at outer and inner peripheries of a circular separation void provided in the device.

The disclosure is addressed toward purification in general and may typically be suited for water purification of fine graded particles such as waste from textiles, car and road washing, tunnel air or oil droplets found in produced water from oil, bilge water from ships from sewage plants. When the term "particle" is used herein, it should be understood that the term encompasses droplets, as we refer to a particle being a small localized object to which can be ascribed several physical or chemical properties such as volume, density or mass. Particle includes fusible and infusible particles and colloidal particles. A colloidal particle may be solid, liquid, or gaseous; as well as continuous or dispersed. The dispersed-phase particles have a diameter of between approximately 5 and 200 nanometers. Particle and droplet may be used interchangeably, depending on the context, but has the same definition, except that a droplet is not infusible.

Demand for removal of small particles dissolved in fluid has increased the recent years, especially removal of small particles that may accumulate in large concentrations and may harm environment and human health. Such pollution can be related to industrial waste, combustion gasses from household and cars, but also simple abrasion from car tires and asphalt roads.

Most particles generated in land-based environment will find their way to the sea, which over decades has been a silent litter for all kind of man-made rubbish and/or waste. The oil and shipping, as well as the textile industries, have in this respect been carefully watched for its pollution potential, but also their need to dispose and/or release large quantities of polluted water. The limits for release of polluted oil in water are per today varying between 15 and 30 ppm among most coast state countries.

A major challenge within the field of to-days oil cleaning and separation technology, is that the maximum economic efficiency of industrial cleaning of large volumes to 30 ppm has in practice been reached long time ago. Subject limits are controlled by a function of volume, (resilience-) time and related operational cost, which bottleneck(s) the purification process.

Another source of pollution is motor vehicles that are generating a concentrated release of so-called road dust. For decades, road verges and their surroundings have been polluted by particles and a number of hazardous substances. In recent years, with increasing focus on microplastics contamination of the environment, one has also become aware of other sources of road dust that will pollute the environment, such as road marking paint, polymer modified bitumen (PMB) from car tire rubber crumbs and PAH from asphaltene.

As pollutants are accumulating in road verges and surrounding areas, they are also, at least partially, transported away with road runoff during rain events. In Norway most of the pollutants end up in the aquatic environment without any applied treatment, whereas runoff from extremely polluted roads and tunnels in urban areas may be discharged to the combined sewer system and thereby (if not retained in gully pots or discharged through sewer overflow) end up in the domestic wastewater treatment plants.

Crumb rubbers granulate produced from end-of-life tires is commonly applied to synthetic turf pitches (STPs), playgrounds, safety surfaces and walkways. In addition to fillers, stabilizers, cross-linking agents and secondary components (e.g. pigments, oils, resins), rubber contain a range of other organic compounds and heavy metal additives. Again, rubber is further wearing out to smaller free contaminating fragments.

There are currently no restrictions to limit subject polymer and rubber pollution, although they are indirectly addressed by EU legislation related to migration of Polycyclic Aromatic Hydrocarbons (PAHs) from plastic and rubber.

Under the REACH regulation (EC 1907/2006 Annex XVII, Entry 50), eight priority PAHs have for some time been restricted in extender oils used in tires.

Furthermore, there has recently been announced that a micro plastics pollution policy has been implemented EUs Strategy for Plastics. This policy is vital, as these miniscule non-biodegradable synthetic polymers are dangerous to the environment, accumulating in the soil and water before finally ending up in the food chain. One striking example is the extensive use of plastic microfibers in the textile industry, which is estimated to account for between 15% and 31% of the 9.5 million tons of plastics entering our oceans each year. France has just adopted a law to curb this pollution, proposing that by 2025 every new washing machine must have a filter to catch plastic microfibers that come away from clothing during washing.

According to the Swedish Environmental Institute IVL, each wash cycle release between 100 to 300 mg fibers/kg garment, amounting to some 500-1 500 000 microfibers in the size range of 5-400 μm.

New and more efficient filtration and cleaning methods and process facilities are therefore urgently needed.

Prior art purification technology has been closely tied to limitations to monitor and detect small contaminants. Recent development within medicine and instruments for characterization of particles in the lower nanoscale, has however, alarmed global awareness about common threats from toxic content in air, water and the food chain.

For same reason there have been no strong arguments to improve or abandon old industrial analog equipment which has been forced to its limits until the wakeup call from accumulated environmental pollution.

The present invention responds to the need for alternatives for today's filtration and cleaning methods, or at least improved solutions for such technological shortcoming that pose a threat to environment and a sustainable future.

Accordingly, it is a principal object of the present invention to overcome the problems associated with prior art filtration and cleaning methods.

The object is achieved according to the present invention with a bi-directional filter as defined in the independent claim 1. Further embodiments of the invention are defined in the dependent claims.

The present invention relates to a bi-directional filter, where the bi-directional filter comprises an outer housing and a filter assembly unit arranged within the outer housing, the outer housing being provided with an inlet for contaminated fluid and an outlet for filtered fluid, where the filter assembly unit comprises at least one separation void for contaminated fluid, the filter assembly unit, at least one separation void and the outer housing providing an outer dead end and an inner dead end within the bi-directional filter, the filter assembly unit furthermore being connected to a drive unit through a shaft.

According to one aspect, the filter assembly unit may comprise a lower disc, an upper disc and at least one filter. The lower and upper discs are arranged at a distance from each other so as to provide a space for the at least one filter, the at least one separation void and at least one clean fluid void.

The filter assembly unit may also comprise a plurality of filters, where the plurality of filters are arranged between the lower and upper discs, and where the plurality of filters are arranged at a distance from each other in order to provide one or more separation voids and one or more clean fluid voids.

In one embodiment the filter or filters may comprise a thin metallic or polymer mesh screen and/or a thick layer of filtering materials, suitable to hinder, bind or pass any desired particles dissolved in a protruding fluid.

In one embodiment the filter assembly unit may be arranged in a container, cartridge or the like.

In one embodiment the outer housing may be provided with an opening mechanism to allow access to an inner of the outer housing, such that the filter assembly unit/container or cartridge could be replaced.

According to one aspect, the bi-directional filter may also comprise an electrical or electromagnetic coil in order to provide a magnetic field within the bi-directional filter, where the electrical or electromagnetic coil may be arranged around an inner periphery of the outer housing or around an outer periphery.

The lower and/or upper disc may be made of steel or a magnetic material.

The lower disc may be provided with one or more inlet holes and risers arranged at a distance from a center of the disc.

The filter may be a membrane filter or a mesh filter. If the filter assembly unit comprises more than one filter, the plurality of filter could all be membrane filter, all be mesh filters or a combination of membrane and mesh filters.

The drive unit may be an electrical motor or a horizontal and/or vertical rotating magnetic field.

Proposed method of purification is particularly well suited for separation of oil from water and thus used as a base case for illustration and exemplification herein.

Contaminating particles are often associated with a solid material but can also be a sphere in form of a liquid droplet or a hybrid of both. Such droplets are well known by the wastewater industry and they may appear as small fractions of Oil in Water (OiW) which are to be removed prior to being dispatched to rivers and sea environment.

Residual contaminations of oily water may be in the form of free oil or large oil drops, but also a large amount of small, dispersed droplets and/or emulsions with diameters less than 50 μm.

Natural gravity settling of oil and water droplets follows Stokes Law, but implies a time-consuming effort and use of large tank spaces and is therefore not feasible to be used at many industrial plants. However, under favourable fluid properties, environmental conditions and by use of unlimited time, it is known that natural gravity may achieve purification in the nano scale. In this context it is also known that improved gravity settling speed may be achieved by a multiple layer of aligned plating and fluid shaking. Further improvements may also be made by increased gravity and use of centrifugal separators, hydro cyclones and coalescers, that may also use ES and EM fields to interact with dissolved contaminants.

Functional mechanism by ES interaction, as used by electro coalescers, comprises use of narrow conduits where a high voltage DC field may induce an electrical charge in conductive water drops. Provided the oil has sufficient dielectric properties, the charge will be conserved and divide the water drop skin with positive and negative ends. Such dipolar state creates a force that will attempt to drive the droplet towards the higher gradient. Experience shows that small droplets fails sufficient charge and power to break loose for a steady movement in desired direction. Applying AC power may for some droplets introduce an oscillation movement which over time, may overcome the shear forces and provides a thinning effect that stimulates further movements. Such oscillation increases the probability of droplet collisions, which leads to small droplets merger and thus gives birth to larger ones, and thereby stimulate the subsequent gravity settling velocity.

Under steady favourable flow conditions, it is known that electric coalescers may achieve oil purification down to some 0.5% water cut. At this stage the total remaining content of dissolved water, emulations, and solid particles etc., must be considered for adequate purification that may be resolved by chemical treatment, use of hydro cyclones, centrifugal separators or filtering.

Filtering technique is known to represent the best qualitative option and may remove Oil in Water (OiW) down to 1 ppm, but by use of to-days art of filtration methodology, not being feasible for use at large flow quantities of oil and solid particles.

The present disclosure concerns thus how a successful interaction between magnetic nano particles (MNP) and Electrostatic (ES)/or and Electromagnetic (EM) shall resolve this deficiency, independent of dissolved fluid and targeted particles initial properties.

The process by which individual particles aggregate into clothlike masses or precipitate into small lumps, is called "flocculation". It occurs as a result of a chemical reaction between the clay particles and another substance, usually salt water. Flocculation is a process wherein colloids come out of suspension in the form of floc or flake, either spontaneously or due to the addition of a clarifying agent. The action differs from precipitation in that, prior to flocculation, colloids are merely suspended in a liquid and not actually dissolved in a solution. In the flocculated system, there is no formation of a cake, since all the flocs are in the suspension.

It is known that centrifugal forces will increase and/or decrease proportionally with the collective weight of MNP-bonded contamination. This disclosure will therefore show how to stimulate some flocculation of the bonded MNP oil-droplets, but also for a further and other purpose than previously addressed. Indeed, ES and EM field variations may well bring MNP and contented droplets to oscillate and collide to larger drops with enlarged MNP interaction. However, by control of said interacting oscillations they may systematically be halted or staggered at their maximum oscillating amplitude in the centrifugal flow direction, the particles with little or no centrifugal forces, will be left in a new orbit with a repeating incremented centrifugal radius and force.

ES and EF field strengths will vary by different frequencies of typically 1 to 5 kHz, for instance 0.1 to 15 kHz, preferably 0.5 to 10 kHz, most preferably 1 to 5 kHz. Use of ferrofluids are known from the early days of NASA rocket fuel development in 1946 and comprise ferromagnetic nano particles such as magnetite and hematite suspended in a colloidal fluid. Each particle is being coated with a surfactant to prevent flocculation.

Later development of the nano technology has enabled many disciplines development of different new applications, including purification of contaminated fluid. Micro and nano sizes particles have been tailor made with coating and inherent properties for suspension in any fluid and functions and are nowadays commercially available via Internet and word wide postal delivery. Various published patents and pending applications do describe certain nanoparticle design, function and usage. Patent application WO 2008/055371 A2 teaches interaction of magnetic nanoparticles for separating a dispersed phase or dissolved material from a continuous phase for removal by an applied magnetic gradient field attraction. Solely use of such methods is not likely be feasible for industrial purification, especially not for inline service.

The present disclosure represents however, another approach for magnetic interaction, namely by addressing the MNP and its bonded oil, to collaborate with centrifugal forced flow and particle drag forces in a tangential filtering process, towards its respective filter disposal locations. Coalescing as well as flocculation of such drops are welcomed for enhanced separation efficiency. Coalescence may be explained as merger of droplets (with or without particles), and flocculation is aggregation thanks to another chemical or particle. Thus, in this disclosure the related terms may be used interchangeably.

Similarly, US patent 8.636.906 B2 claims the rights to manually remove a target moiety from a liquid using magnetic nanoparticles by allowing said particles to establish moiety complexes, for thereafter using a magnetic field to segregate the nanoparticles from the fluid for a subsequent manual removal.

It is obvious that the above referred patents in discrete steps, teaches how to use gradient magnet field interaction to gather, isolate and collect bulks of targeted particles in a solution, —but again not considered suitable for real time purification of a continuous flow.

The present invention does however address use of MNP interaction in a distinct different way as well as for another objective. MNP and bonded oil droplets in water will here enter into a rotating centrifugal bi-directional filter, which is equipped with a perpendicular directed magnetic field of adequate strength. The moving MNP and bonded oil will thus be subject to an interacting radial magnetic force with a vectoral direction towards desired located disposal sites.

The U.S. Pat. No. 7,699,979 B2 patent outlines how horizontal and vertical rotating magnetic fields can be used to mix affinity moieties to contaminants dissolved in a fluid. The present disclosure recognize that such magnetic fields can be employed for mixing MNP and targeted contamination, but also be tuned and used as a substitute for a motor drive, providing centrifugal fluid rotation and magnetic forces as proposed to achieve bi-directional tangential filtering, caking and contamination storage.

Subject disclosure demonstrates how to exploit magnetic force action on an MNP to be superposed to ES forces acting in a preferred direction and thus enhance the filtration efforts.

It should be noted that the term MNP is one representative of a large family of different materials such as: paramagnetic, diamagnetic, ferromagnetic, antiferromagnetic etc. Corresponding properties exemplified herein is however limited to paramagnetic magnetism in the sole attempt to exemplify the act of purification. Notwithstanding usage of other materials, iron oxide nanoparticles $Fe_3O_4$ are preferred used due to its none-toxic effects and no harm to the environment. In form of solid magnetite, it will have a specific weight of 5.200 kg/m³.

Paramagnetic iron oxide represents a form of magnetism which occurs only in the presence of an externally applied magnetic field. Paramagnetic materials have a relative magnetic permeability of 1 or more. Paramagnets do not retain any magnetization in the absence of an externally applied magnetic field.

Notwithstanding other possible alternatives of MNP sizing, addressed use herein may range in diameter between about 1 nm and about 500 nm, and preferably 1 to 50 nm in cases where so-called superparamagnetic iron oxide nanoparticles (SPION) are being used.

As published by Venugopal (2014)—Controlling Dielectric and Magnetic Properties of PVdF/Magnetite Nanocomposite Fiber Webs and further detailed by Sedighi (2018)— Fabrication of electrically conductive superparamagnetic fabric with microwave attenuation, antibacterial properties and UV protection using PEDOT/magnetite nanoparticles, an emerging trend in the textile industry has been made. It is aimed to make synthetic fibers less electrostatic and thus enhance the wearability of more comfortable fabrics.

The disclosed invention may thus propose adding such functionalized MNP to laundries wash machine water, detergent, fabric softener and/or enzyme dosing system for accelerated contamination breakdown. Subjecting EM/ES field during the rinse water spinoff cycle will aid collection of free and targeted particles/microfibers that subsequently are to be filtered.

Centrifugal separators assume Newtonian fluids and particles with distinct differences in subject materials density/specific weight, in such way that the heavier content seeks the outer radius, whereas the lighter fractions forms division borders between each pool of distinct density/specific weight.

In order to resolve the challenge by separation of OiW where iron oxide MNP is heavier than oil and water, the following alternative groups of usage are proposed herein. Heavy solid functionalized Iron core oxide particles (Magnetite) $\rho>5$ and Lightweight hollow core or Hybrid Particles (SPIONs embedded in shell) $\rho<1$. Different usage demands a different functional approach in MNP usage, in such way that the heavy solid core iron oxide is being functionalized to absorb contaminating oil, whereas lightweight hollow spheres or light dense multi hollow polymer spheres, have a functionalized outer shell of embedded SPIONs.

As outlined above, interaction may be performed by use of the following physical phenomena: i)—Electro Magnetic Fields (EMF), ii)—Electro Static Fields (ESF), ii)—Concurrent and/or discrete acting EMF and ESF.

Such interactions can be aimed towards MNP of different densities $\rho>1$ and $\rho<1$, but also in different combination of interacting fields and separation techniques for oil in water, water in oil and separation of oily MNP.

This disclosure shows how to enable use of MNP with different properties and mix of heavy and lightweight particles for a concurrent targeting different substances.

BRIEF DESCRIPTION OF THE DRAWINGS

Further objects, structural embodiments and advantages of the present invention will be seen clearly from the following detailed description, the attached drawings and the claims below.

The invention will now be described with reference to the attached figures, wherein:

FIG. 2 shows a prior art roundel disk filter stack as outlined in the "Food Engineering Handbook" (Vazakas 2014), FIG. 13 shows yet an alternative embodiment of the bi-directional filter arrangement according to FIG. 10 comprising a plurality of double-sided metal mesh filters.

DETAILED DESCRIPTION OF THE INVENTION

Figure 1:
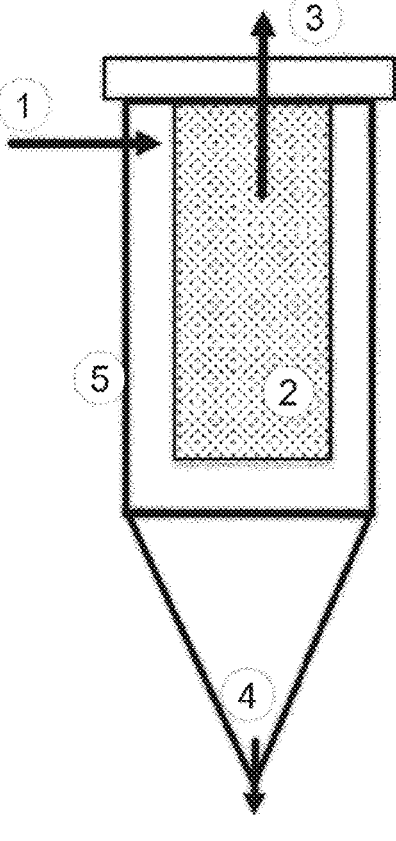
FIG. 1 shows schematically a prior art cyclone filter.

FIG. 1 shows in a schematic way a prior art cyclone filter F, where the cyclone filter comprises an outer housing 5 provided with a high-pressure fluid inlet 1 and a filter 2 arranged inside the outer housing 5. The outer housing 5 will also form an inner chamber into which chamber the fluid to be treated and/or purified is fed into. An inside of the chamber creates a spiral vortex. The lighter components of the fluid will have less inertia and it will therefore be easier for them to be influenced by the vortex and concentrated around an outer periphery or circumference of the filter 2. Filtered fluid will enter through the filter 2 and thereafter be discharged through an outlet 3. Contrarily, larger or heavier components of particulate matter of the fluid will have more inertia and will be centrifuged to an inner periphery or circumference of the outer housing 5 and will be drained out from the cyclone filter F through an outlet 4 provided at a bottom of the cyclone filter F.

FIG. 2 shows a prior art roundel disk filter stack where a pressurized filter housing enables a forced flow of contaminated fluid into each filter plate. For service and maintenance, fluid in the filter stack will be removed and the roundel cleaning performed by centrifugal rotation forces.

Through the roundel disk filter stack it is obtained that the purification of particles and fractions by natural gravity forces are divided in phases, where the settling velocity is dependent of degree of free sight on its way to the bottom. Gravity settling follows Stokes Law, defining certain fluid properties for particles that sink (or rise) with a constant velocity, namely that the difference in specific weight must be larger (or smaller) than the sum of particle buoyancy and hydraulic friction, also called drag force as illustrated in FIG. 3.

Figure 3:
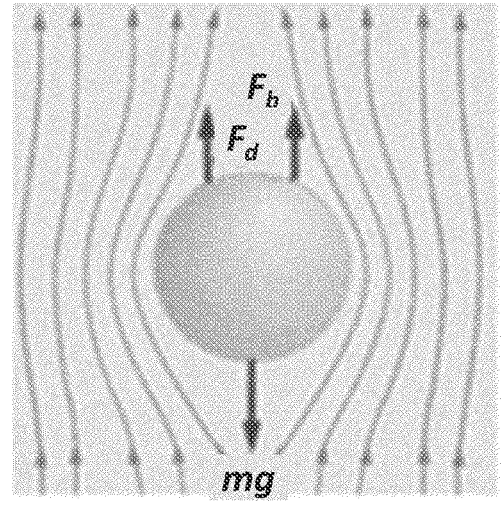
FIG. 3 illustrates a falling particle subject for Stokes law for force balance.

FIG. 3 illustrates forces acting on a particle (a sphere) as the particle sinks through a liquid column under the influence of gravity. The force acting in resistance to the fall is equal to $6\pi r\eta v$, in which r is a radius of the sphere, $\eta$ is the viscosity of the liquid, and v is the velocity of fall. The force acting downward is equal to $4/37\pi r^3$ (d1–d2)g, in which d1 is the density of the sphere, d2 is the density of the liquid, and g is the gravitational constant. At a constant velocity of fall the upward and downward forces are in balance. Equating the two expressions given above and solving for v therefore yields the required velocity, expressed by Stokes's law as $v=2/9(d1-d2)gr^2/\eta$.

Figure 4:
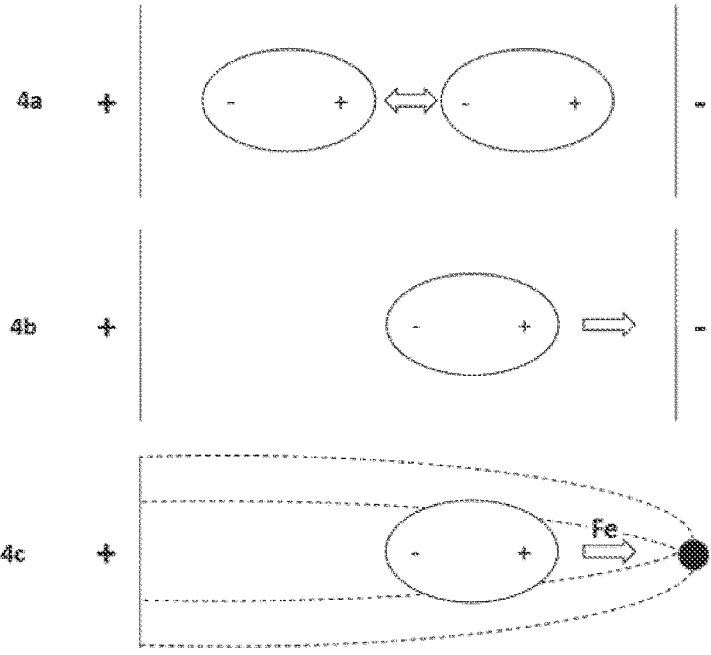
FIG. 4 illustrates how an Electrostatic force is acting on a dipole.
Figure 5:
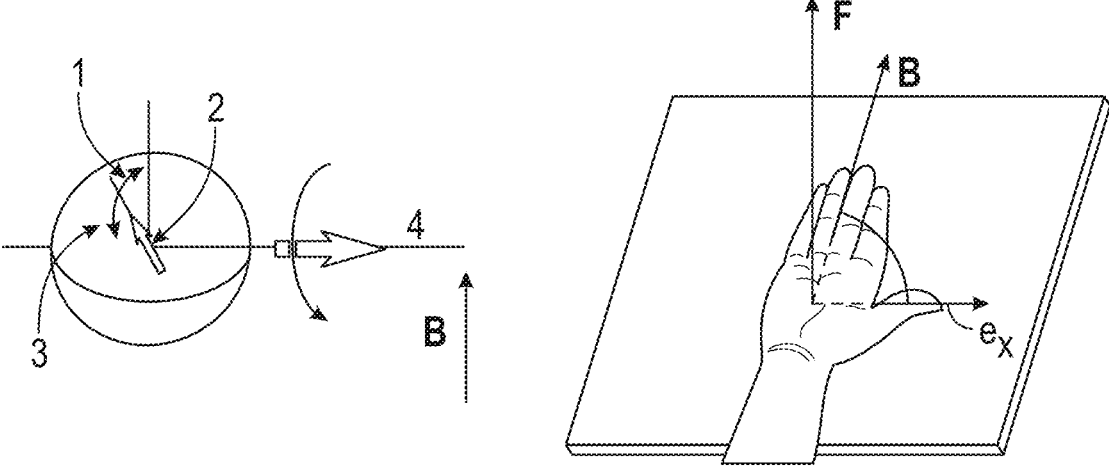
FIG. 5 shows dynamic interaction of magnetic fluxes, MNP and resulting phenomena acting on a particle in motion, FIG. 6 visualizes field and related forces Fc, Fs, Fm.

Particles and droplets dissolved in fluid may be polarized by interaction of external electrostatic fields and being attracted by a force toward the same field as illustrated in FIG. 4. Correspondingly, FIG. 5 shows how a magnetic field will interact a force on a magnetic particle P in motion. Although similar phenomena have been exploited over many years by the purification industry, significant short-coming has been experienced as some particles resists said polarization. This has made said methods less relevant due to usability, capacity and efficiency. By projecting subject properties over to multiple different MNP that can provide a safe interaction by both ES and/or EM and thus different targeted contamination, it provides a more universal, pre-dictable and effective method and system for industrial purification.

In FIG. 5 reference numeral 1 denotes magnetic torque, reference numeral 2 denotes magnetic moment, reference numeral 3 denotes mechanical torque and reference numeral 4 denotes vorticity. Lorentz force F acts on a charged particle (of charge q) in motion (instantaneous velocity v). Electrical field E and magnetic field B field may vary in space and time and obeys the "Right Hand Rule".

Figure 6:
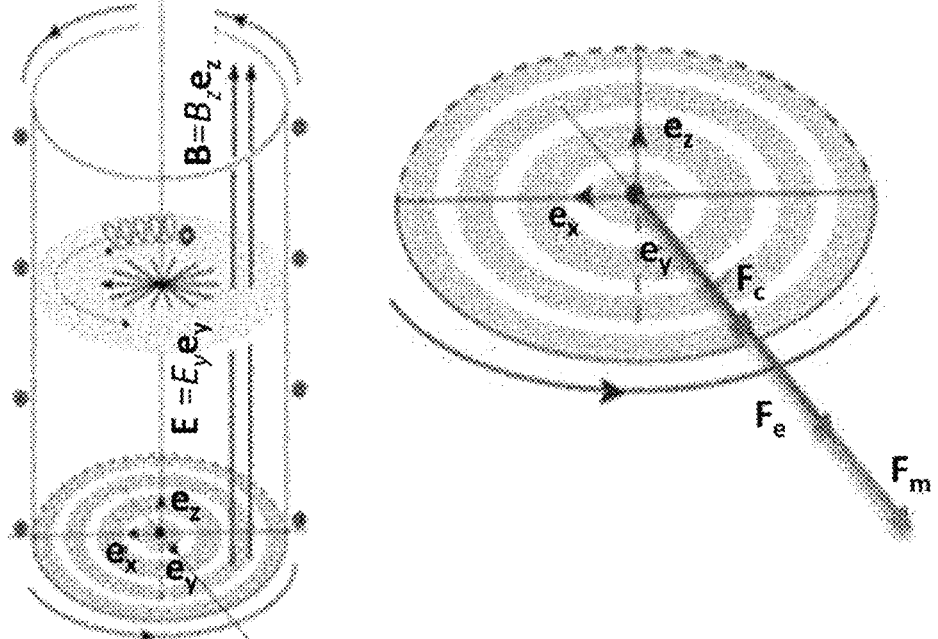

FIG. 6 illustrates how interaction of magnetic nanopar-ticles (MNP)—targets can be controlled by electrostatic and magnetic fields to collaborate with the even minor or initial non-existing centrifugal forced contamination. Centrifugal force acts equally on each point by establishing a fluid pressure differential over each particle or complex groups. Magnitude of subject pressure is given by $$\Delta P_c \approx \frac{1}{2}(\rho_s - \rho)\left(r_1^2 - r_2^2\right)\omega^2,$$

that will equal a particle force of:

$$F_c = \frac{\pi d^3}{6}(\rho_s - \rho)r\omega^2,$$

where
$\rho$=density, r=radius, d=particle diameter, and $\omega$=angular velocity.

Subject force obviously demands a certain difference in density. Collaboration with magnetic nanoparticles (MNP) and interaction via EM and/or ES forces aims to alleviate this deficiency. Such force is expressed through Lorentz equation: F=qE+qv×B, where
F=Lorentz force, q=magnetic charge, E=electrical field strength, v=velocity and B=magnetic field strength, Which, in related Computational Fluid Dynamics simulation and laboratory tests, is shown to be more than 100 times stronger than corresponding centrifugal forces acting on small particles.

By bonding magnetic nanoparticles (MNP) to subject particles and thereby adding common properties, it is foreseen that multiple MNP—droplets will add weight (or buoyancy) and volume as a time dependent function. However, a slight change may allow a certain elastic movement, that may well be generated by oscillation of the EM and ES fields and interacting forces.

It can thus easily enable a phenomenon known as thinning, which is tied to an initial movement of dissolved particles influence on the layer around the particles and lowers dynamic resistance. It is consequently an objective to utilize said forces in a coordinated act to achieve a maximum oscillation, and to systematically cut the EM and ES power at max amplitude in the flow direction. Subject particles will then remain in the new orbit with an enhanced centrifugal force, and thus reportingly have their separation velocity significantly increased.

Figure 8:
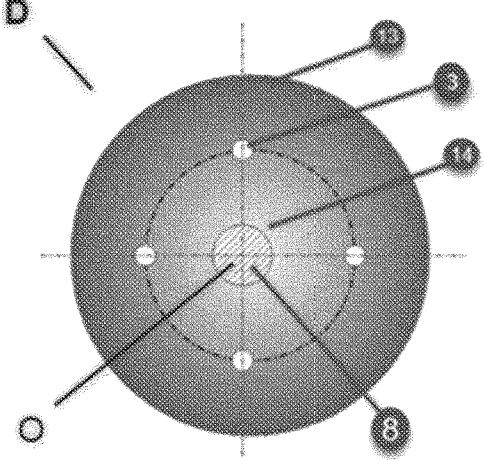

Separation phases and how they divide at a steady state operation, is for the heavy 2-phase EMF separation case for MNP ρ>1, represented in FIG. 8, the distribution being shown around a disc plate D used in a bi-directional filter assembly according to the present invention. The disc plate D is provided with four riser holes 3, and where an outer dead end 13 and an inner dead end 14 is formed in the disc plate D when the disc plate D is assembled in the bi-directional filter assembly according to the present invention. The disc plate D is also provided with a throughgoing opening O through its center, such that a motor shaft 8 may extend through the disc plate D. Oil droplets and/or agglomerations of MNP saturated by absorbed oil, will be centrifuged as heavy particles in a cake clarification separating process. EMF interaction will further enhance the pool of dense oily MNP and water, establishing the following phase diversions: i) Outer separation phase in way of outer dead end 13 will be a cake of compact oily MNP with some water, ii) Middle pool in way of riser holes 3 will consist of a water solution with dense oily MNP and iii) Inward pool in way of inner dead end 14 will comprise clear water ready to be filtered from dissolved particles.

Centrifugal separators with vertical disk stack may operate at high speed gaining some 100.000 G, which are primarily applied for the clarification and polishing. The throughput capacities of industrial separators range from 50 to 250,000 l/h. Its general design can easily be configured for purification of various contaminated fluid from oil and gas production such as drilling mud, brine, MEG, heavy oil produced water, bilge water as well as to clarify portable water etc. Magnitude of worldwide daily use of centrifugal separators has recently been calculated to a number of some 30-50.000 units only in the marine area (GEA Fachkolloquium 3-2018).

Figure 7A:
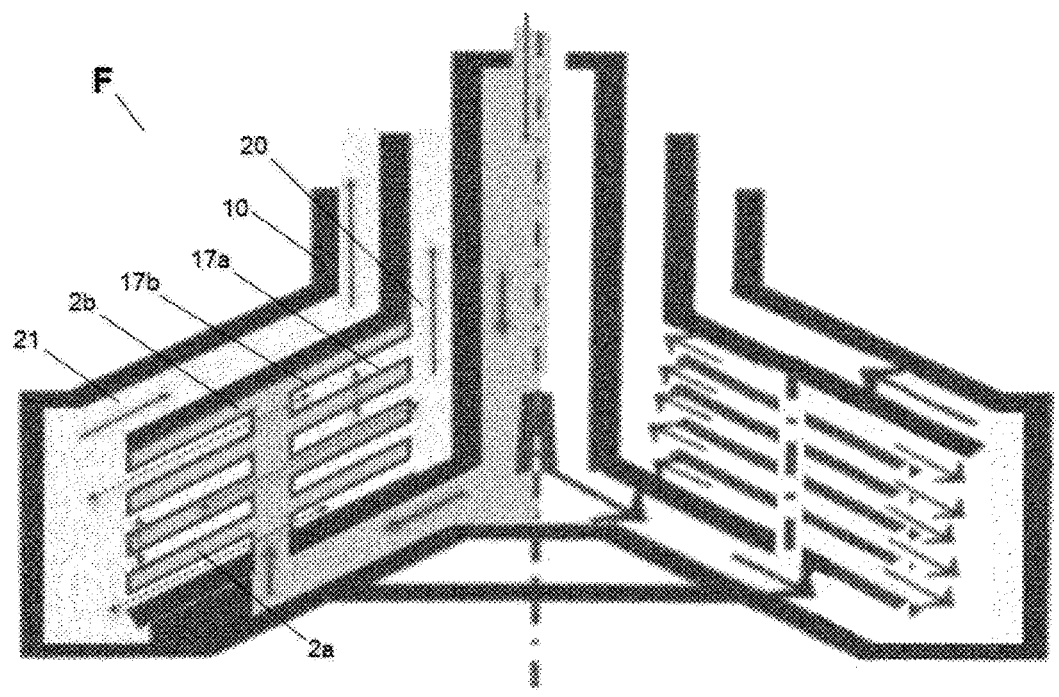
FIG. 7a illustrates the transformation of a centrifugal separator at the right side, and over to an exemplary embodiment of a bi-directional centrifugal filter arrangement according to the present invention on the left side.
Figure 7B:
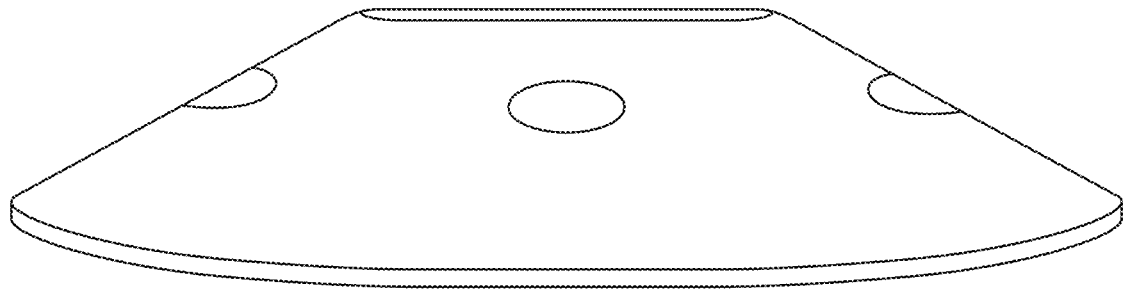
FIG. 7b shows a disc plate in a conical frustum type disk stack.
Figure 7C:
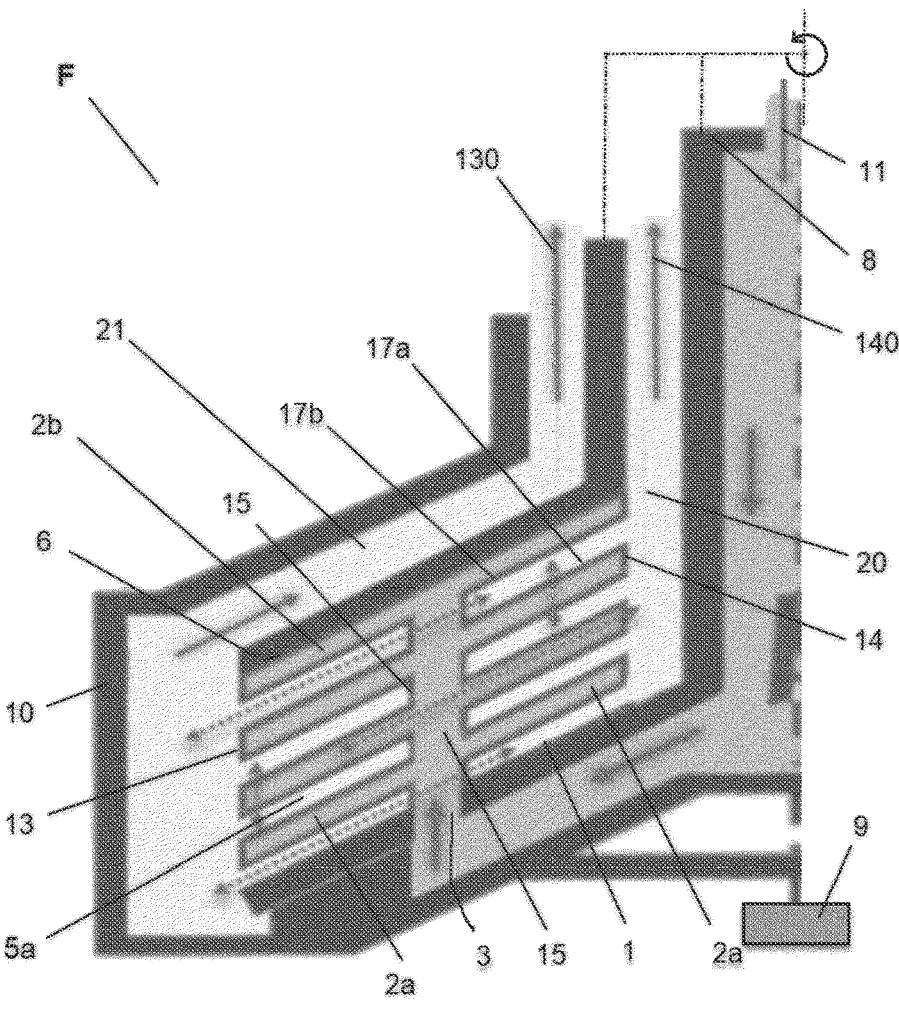
FIG. 7c shows the bi-directional filter arrangement on the left side in greater detail, FIG. 8 indicates centrifugal distribution of oil and water relative to the vertical orientated inlet riser 15 and holes 3 of a disc plate used in a bi-directional filter assembly according to the present invention.

A 2-phase centrifugal bi-directional and double-sided mesh 17a and 17b filter according to the present invention is shown in more details in FIGS. 7a and 7c, where it appears that all oil related particles have been married with a satisfactory number of magnetic nanoparticles (MNP).

FIGS. 7a-7c show a two-phase centrifugal bi-directional filter F according to the present invention. FIG. 7a shows a "transformation" from a prior art centrifugal vertical stack separator (shown on right side) to an exemplary embodiment of a bi-directional centrifugal filter according to the present invention (shown on left side).

The two-phase centrifugal bi-directional filter F shown in FIGS. 7a, 7c comprise a plurality of double-sided filters 4 with mesh areas 17a, 17b, where the plurality of filters 4 are arranged within an outer housing 10, between a lower disc 1 and an upper disc 6. The outer housing 10 is provided with one or more inlets 11 for contaminated fluid and the outlets 130, 140 for separated phases of the contaminated fluid.

The centrifugal bi-directional filter F may therefor be used to separate liquid—gas, oil—water or the like.

The lower disc 1 is provided with a number of riser holes 3 that allows contaminated fluid to flow through the lower disc 1 and into the separation void 2a. The riser holes 3 are situated at a preselected radial distance from the rotational axis as appropriate to divide particles and phases in accordance to their densities.

Four filters 4 with a double-sided mesh 17a, 17b are arranged within the annular outer housing 10, where the filters 4 with double-sided mesh 17a, 17b are arranged at a distance between each other, in order to provide a space 5a between two adjacent filters 4. The space or spaces 5a provided between the filters 4 is/are used to transport the separated phases to two separate annular compartments 20, 21 provided within the outer housing 10 and to the separate outlets 130, 140.

The stacked filters 4, lower disc 1, annular compartments 20, 21 and annular spaces 2a, 2b (separation voids) will form a filter assembly unit in the bi-directional filter F.

In one embodiment the filter assembly unit may be arranged in a container (not shown) or cartridge located within the outer housing 10.

The outer housing 10 may be provided with an opening mechanism (not shown) to allow an access to the container or cartridge inside the outer housing 10, such that the filter assembly unit/container or cartridge, manually or automatically, could be removed and replaced entirely, the rejected assembly being ready for return recycling shipment.

When the bi-directional filter F is assembled, the annular compartments 20, 21, which is delimited by an inner circumference of the outer housing 10 and an outer circumference of the filters 4, will form an outer dead end 13 near the outer housing 10, while the annular spaces 5a provided between the filters 4 will form an inner dead end 14 around the shaft 8.

Each double-sided filter 4 is provided with a number of riser holes 3 and risers 15, thereby allowing the contaminated fluid to be distributed between the mesh filters 4.

The outer housing 10 and the filters 4 are provided with a central throughgoing hole, such that a shaft 8 can be inserted into the outer housing 10 and through the filters 4. The filters 4 are connected to the shaft 8 in appropriate ways. The shaft 8 is connected to a drive unit 9, where the drive unit 9 may be an electric motor or the like.

It could also be envisaged that horizontal and/or vertical acting magnetic interacting fields could be used to rotate the free fluid content within the filter assembly unit.

Contaminated fluid from inlet 11 will be guided into the space 2a provided between the outer housing 10 and the first filter 4 and the fifth filter 4 and the outer housing 10, whereafter the contaminated fluid will flow through the number of riser holes 3 and tubular elements 15 and rise upwards within the filter assembly in order to be distributed to the filters 4 through the separation voids 2a and 2b when the filter assembly rotates at high speed. Centrifugal forces will then separate dissolved contamination of different weight.

The centrifugal forces will also result in that the contaminated fluid, comprising more phases, will be separated into the respective phases, for instance liquid and gas, oil and water, where the lighter fractions will be separated to flow out through outlet 140, while heavier fractions will be separated to flow out through outlet 130.

Figure 9:
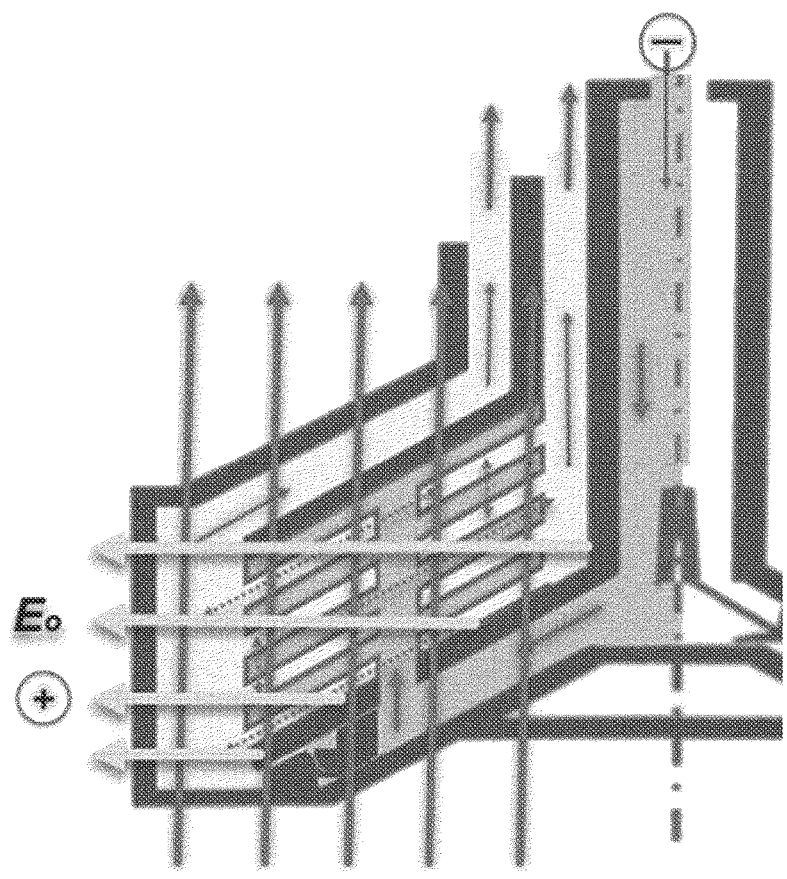
FIG. 9 shows a principal arrangement for electromagnetic fields B and electrostatic fields Eo arranged for a frustum type filter disk stack.
Figure 10:
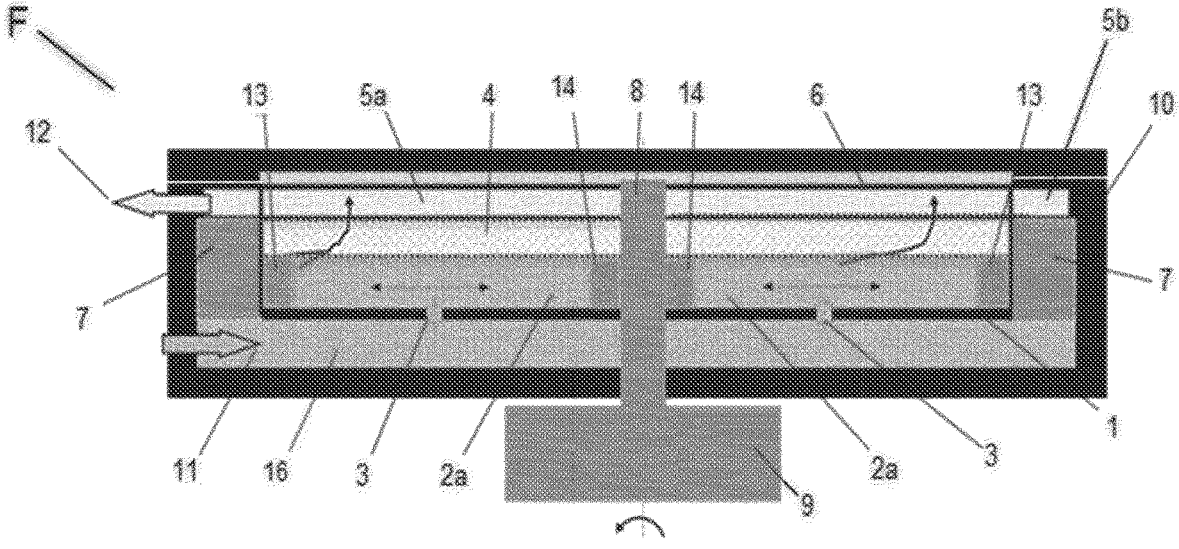
FIG. 10 illustrates another exemplary embodiment of the bi-directional filter assembly according to the present invention.

An electromagnetic (EM) field arrangement, which may be arranged as an outside coil 7, as for instance shown in FIG. 10, as well as an electrostatic (ES) power high voltage potential between rotor and stator of a centrifugal disc separator has been illustrated in FIG. 9. Furthermore, FIG.

9 shows how the electromagnetic fields B and the electrostatic fields Eo are arranged to extend over a frustrum type filter disc stack.

Electrostatic field (ESF) interaction is provided through a horizontal potential and field between the stator and rotor of the centrifugal disc separator. Voltage will typically be as for electro coalescers, 0-5 kV at 0-5 kHz. Electromagnetic fields may be provided through coil 7 outside of the centrifugal disc separator stator. Disc stack will preferable be made from materials with high magnetic permeability.

FIG. 10 shows an alternative embodiment of a bi-directional filter F according to the present invention, where the bi-directional filter F comprises an annular outer housing 10, in which annular outer housing 10 an annular lower disc 1 and an annular upper disc 6 are arranged. The outer housing 10 is provided with one or more inlets inlet 11 for contaminated fluid and one or more outlet 12 for filtered fluid.

The annular lower and upper discs 1, 6 are arranged at a distance from each other in order to provide a space for a separation void 2a, a filter 4 and a clean fluid void 5a.

The filter 4 may comprise a thin metallic or polymer mesh screen and/or comprise a thicker layer of relevant filtering materials.

An electric coil 7 is furthermore arranged around an inner periphery of the outer housing 10.

The lower and upper discs 1, 6, the filter 4, separation void 2a and clean fluid void 5a will form a filter assembly unit in the bi-directional filter F.

In one embodiment the filter assembly unit may be arranged in a container (not shown) or cartridge located within the outer housing 10.

The outer housing 10 may be provided with an opening mechanism (not shown) to allow an access to the container or cartridge inside the outer housing 10, such that the filter assembly unit/container or cartridge could be replaced entirely and/or to allow filter assembly unit to be disassembled for replacement.

The lower disc 1 is also provided with a number of riser holes 3 that allows contaminated fluid to flow through the lower disc 1 and into the separation void 2a. The riser holes 3 are situated at a preselected radial distance from the rotational axis as appropriate to divide particles and phases in accordance to their densities.

A stack of multiple filter assemblies F will have riser holes 3 arranged along a same vertical axis. The riser holes 3 will thus, when the filters 4 are assembled, form a tubular conduct which provides contaminated fluid flow to all separation voids 2a, 2b and filters 4.

A lower side of the outer housing 10, the lower and upper discs 1, 6 and the filter 4 are furthermore provided with a central throughgoing hole, such that a shaft 8 can be inserted into the outer housing 10 and through the lower and upper discs 1, 6 and the filter 4, whereby the lower and upper discs 1, 6 and the filter 4 are connected to the shaft 8 in appropriate ways. The shaft 8 is connected to a drive unit 9, where the drive unit 9 may be an electric motor or the like.

It could also be envisaged that horizontal and/or vertical acting magnetic interacting fields could be used to rotate the free fluid content between the upper and lower discs 1, 6, both in the case of a single filter assembly as well as a multiple stack.

When the bi-directional filter F is assembled, the separation void 2a, which is delimited by an inner circumference of the electric coil 7, the lower surface of the filter 4 and the upper surface of the lower disc 1, will form an outer dead end 13 near the outer circumference of the outer housing 10, and an inner dead end 14 around the shaft 8.

The contaminated fluid, which may be pressurized, will enter into the outer housing 10 through the inlet 11 for the contaminated fluid.

The contaminated fluid will thereafter flow through the number of riser holes 3 provided in the lower disc 1 and rise into the separation void 2a formed between the lower disc 1 and filter inlet 4.

The bi-directional filter F will be rotating at high speed, were centrifugal forces separates dissolved contamination of different weight.

The magnitude of such rotating force given by $F_c+F$, will effectively direct and force heavy particles to the outer dead end 13 of the separation void 2a, whereas the lighter content will be forced to the inner dead end 14 of the separation void 2a, where subject disposals will be compacted and caked.

The majority of the contaminated fluid will be forced to the outer and inner dead ends 13, 14 of the separation void 2a, which also represents the highest loaded filtration area. The fluid will at this point change its flow direction 900 into the filter 4. The filter load and fouling will thus follow same incremental build and direction as contamination cacking until the filter 4 is optimal utilized and due for renewal.

The fluid will leave the filter 4 and the filtered or clean fluid will flow out in an open void 5a provided between filter 4 and the upper disc 6 and further out through outlet 12. As to the fact that micro and nanosized particles weight is insignificant for centrifugal forces, they may randomly move and be dragged in random directions. It is known that some particles are or can be magnetically pre-charged for magnetic attraction. Another more reliable technique is to let Functionalized Magnetic Nanoparticles (MNP) bind onto subject contamination to secure a defined source for an external magnetic interaction.

Figure 12:
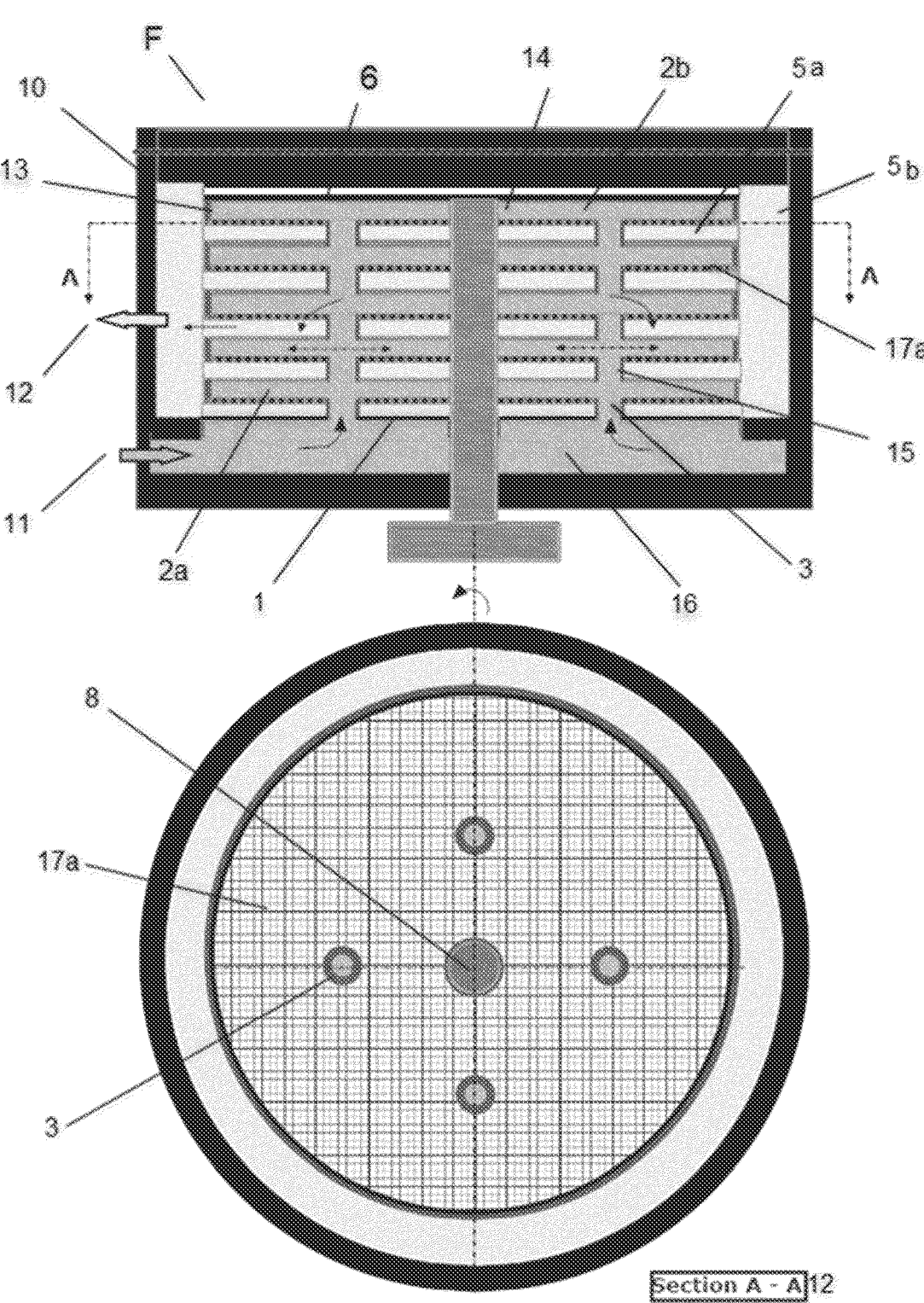
FIG. 12 shows yet an alternative embodiment of the bi-directional filter arrangement according to FIG. 10 comprising a plurality of single sided metal mesh filters.

Since the bi-directional filter F alternatively may comprise one filter assembly unit as shown in FIG. 10 or a filter assembly unit comprising multiple stacked integral filters 4, separation voids 2a and clean fluid voids 5a as shown in FIG. 12, a flow of contaminated fluid can be directed to use one filter surface along the separation void 2a to reach the clean fluid void 5a. As used herein, the expression "single-sided filter" should be understood to comprise filter 4/filters 4 as shown in FIGS. 10 and 12 where contaminated fluid flows from respective separation voids 2a or 2b, through filter 4/filters 4 and into clean fluid void 5a/clean fluid voids 5a from one side.

Figure 11:
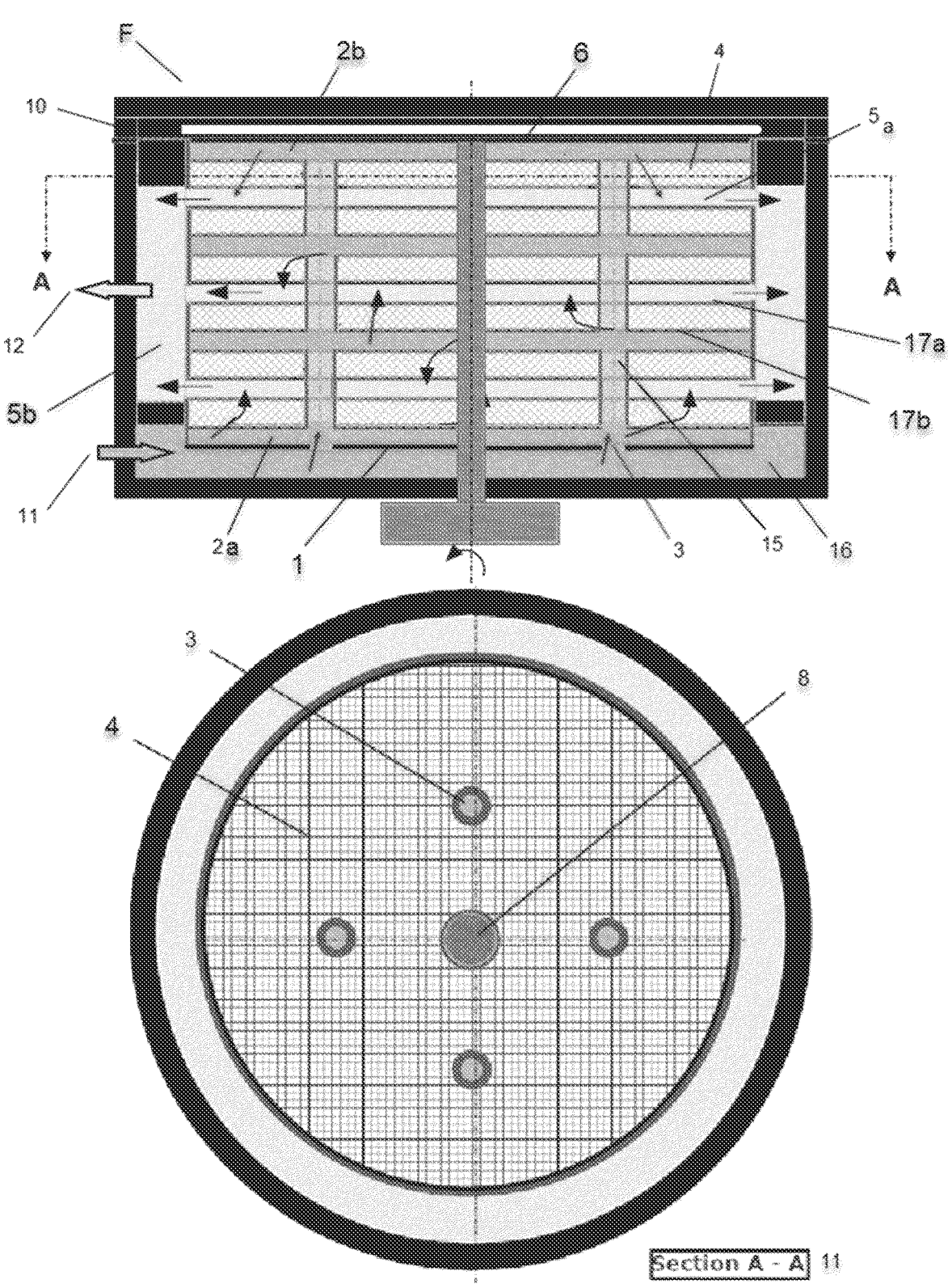
FIG. 11 shows an alternative embodiment of the bi-directional filter arrangement according to FIG. 10 comprising a plurality of membrane type filter elements.

Correspondingly, the expression "double sided filter" denotes filters 4 as shown in FIG. 11 and FIG. 13, where contaminated fluid flows from the separation voids 2b through the filters 4 and into the clean fluid void/voids 5a from two sides as being illustrated in more details in FIG. 7c, where fluid may embark the clean fluid void 5a from either filter area 17a or 17b.

FIG. 9 indicates how external tuned Electromagnetic field B and Electrostatic field Eo may be applied for bi-directional filtration. Typically for minor flow and small filter assemblies, such as for purification of textile fibers from personal washing and drying machines, a simple use of a static magnet may be appropriate. With reference to FIG. 10 and for the sake of attracting MNP and targeted contamination in due course toward respective dead ends 13, 14, the lower disc 1 of the disk assembly may be made single side magnetic.

A person skilled in the art would know how the lower disc 1 could be made magnetic on one and/or both sides, whereby this is not described any further herein.

The contaminated fluid may comprise magnetic nanoparticles that either have been added to the fluid and/or being an inherent property of the contaminated particle property, as referenced above by Venugopal (2014) and Sedighi (2018).

FIG. 11 shows an alternative embodiment of the bi-directional filter F, where the bi-directional filter F comprises an annular outer housing 10, in which annular outer housing 10 an annular lower disc 1 and an annular upper disc 6 are arranged. The outer housing 10 is provided with one inlet 11 for contaminated fluid and an outlet 12 for filtered fluid.

Although the outer housing 10 is shown with only one inlet 11 for contaminated fluid and one outlet 12 for filtered fluid, it should be understood that the outer housing 10 could be provided with more than one inlet 11 for contaminated fluid and/or more than one outlet 12 for filtered fluid.

The lower disc 1 is also provided with a number of riser holes 3 that allows contaminated fluid to flow through the lower disc 1 and into the separation void 2a. The riser holes 3 are situated at a preselected radial distance from the rotational axis as appropriate to divide particles and phases in accordance to their densities and quantity of appearance.

Six single sided filters 4 are arranged within the annular outer housing 10, where the filters 4 are arranged at a distance between each other, in order to provide an annular space 5a between two adjacent filters 4. The annular space 5a provided between a first and second filter 4, between a third and fourth filter 4 and between a fifth and sixth filter 4 will be used to transport filtered fluid to an annular space 5b provided within the outer housing 10, where the annular space 5b is provided with the outlet 12. An annular space (separation void) 2a, 2b provided between the outer housing 10 and the first filter 4, between a second and third filter 4, between the fourth and fifth filter and between the sixth filter and the outer housing 10 will be used to transport contaminated fluid from the inlet 11 for contaminated fluid and to the number of filters 4.

The stacked filters 4, annular spaces 5a (clean fluid voids), annular space 5b and annular spaces 2a, 2b (separation voids) will form a filter assembly unit in the bi-directional filter F.

In one embodiment the filter assembly unit may be arranged in a container (not shown) or cartridge located within the outer housing 10.

The outer housing 10 may be provided with an opening mechanism (not shown) to allow an access to the container or cartridge inside the outer housing 10, such that the filter assembly unit/container or cartridge, manually or automatically, could be removed and replaced entirely, the rejected assembly being ready for return recycling shipment.

The filter assembly unit comprising the stack of multiple filters 4 will have riser holes 3 arranged along a same vertical axis. The riser holes 3 will thus, when the filters 4 are assembled, form a tubular conduct which provides contaminated fluid flow to all filters 4. In order to divide clean fluid voids 5a and 5b from contaminated fluid, the tubular conduit comprise a sealed riser tubing 15 arranged between each clean fluid void 5a and separation void 2a as well as filter 4.

Furthermore, the outer housing 10, the lower disc 1 and the filters 4 are provided with a central throughgoing hole, such that a shaft 8 can be inserted into the outer housing 10 and through the filters 4. The filters 4 are connected to the shaft 8 in appropriate ways. The shaft 8 is connected to a drive unit 9, where the drive unit 9 may be an electric motor or the like.

It could also be envisaged that horizontal and/or vertical acting magnetic interacting fields could be used to rotate the free fluid content within the filter assembly.

When the bi-directional filter F is assembled, the annular space 5b, which is delimited by an inner circumference of the outer housing 10 and an outer circumference of the filters 4, will form an outer dead end 13 near the outer housing 10, while the annular spaces 5a provided between the filters 4 will form an inner dead end 14 around the shaft 8.

Contaminated fluid from inlet 11 flow through the number of riser holes 3 and tubular elements 15 and thus be distributed to all separation voids 2a, 2b and to the first filter 4 and the sixth filter 4 when the filter assembly rotates at high speed. Centrifugal forces will then separate dissolved contamination of different weight.

The contaminated fluid will thereafter be forced to flow through the filters 4 in order to be cleaned. The filtered or clean fluid will thereafter flow through the annular spaces 5a in order to be collected in the outer annular space 5b and further through outlet 12.

Arrows show that the contaminated fluid from a separation void 2a may be filtered through a filter 4 arranged above the separation void 2a, through a filter 4 arranged below the separation void 2a, or through both the upper and lower filters 4.

Magnitude of such rotating force given by $F_c + F$, will effectively direct and force heavy particles to the outer dead end 13 of the annular compartment 5a, whereas the lighter content will be forced to the inner dead end 14 provided around the shaft 8, where subject disposals will be compacted and caked.

The majority of the contaminated fluid will be forced to the outer and inner dead ends 13, 14 of the separation voids 2a and 2b being delimitated of the annular space 5b and the shaft 8, which also represents the highest loaded filtration area.

FIG. 12 shows an embodiment of the bi-directional filter F, where the bi-directional filter F comprises an annular outer housing 10, in which annular outer housing 10 an annular lower disc 1 and an annular upper disc 6 are arranged. The outer housing 10 is provided with one inlet 11 for contaminated fluid and an outlet 12 for filtered fluid.

Although the outer housing 10 is shown with only one inlet 11 for contaminated fluid and one outlet 12 for filtered fluid, it should be understood that the outer housing 10 could be provided with more than one inlet 11 for contaminated fluid and/or more than one outlet 12 for filtered fluid.

The lower disc 1 is also provided with a number of riser holes 3 that allows contaminated fluid to flow through the lower disc 1 and into the separation void 2a. The riser holes 3 are situated at a preselected radial distance from the rotational axis as appropriate to divide particles and phases in accordance to their densities and quantity of appearance.

Five filters 4 with a single sided mesh 17a are arranged within the annular outer housing 10, where the filters 4 are arranged at a distance between each other, in order to provide a space 5a between two adjacent filters 4. The space 5a provided between two single sided adjacent mesh filters 4 is/are used to transport filtered fluid to an annular ring room 5b provided within the outer housing 10 and the outlet 12.

The stacked filters 4, lower disc 1, annular spaces 5a (clean fluid voids), annular space 5b and annular spaces 2a, 2b (separation voids) will form a filter assembly unit in the bi-directional filter F.

In one embodiment the filter assembly unit may be arranged in a container (not shown) or cartridge located within the outer housing 10.

The outer housing 10 may be provided with an opening mechanism (not shown) to allow an access to the container or cartridge inside the outer housing 10, such that the filter assembly unit/container or cartridge, manually or automatically, could be removed and replaced entirely, the rejected assembly being ready for return recycling shipment.

When the bi-directional filter F is assembled, the annular space 2b, which is delimited by an inner circumference of the outer housing 10 and an outer circumference of the mesh filters 4, will form an outer dead end 13 near the outer housing 10, while the annular spaces 5a provided between the filters 4 will form an inner dead end 14 around the shaft 8.

Each mesh filter 4 is provided with a number of riser holes 3 and risers 15, thereby allowing the contaminated fluid to be distributed between the mesh filters 4.

The outer housing 10 and the filters 4 are provided with a central throughgoing hole, such that a shaft 8 can be inserted into the outer housing 10 and through the filters 4. The filters 4 are connected to the shaft 8 in appropriate ways. The shaft 8 is connected to a drive unit 9, where the drive unit 9 may be an electric motor or the like.

It could also be envisaged that horizontal and/or vertical acting magnetic interacting fields could be used to rotate the free fluid content within the filter assembly unit.

Furthermore, each mesh filter 4 is provided with meshes 17a on only one of its sides.

The contaminated fluid from inlet 11 will be guided into the space 2a provided between the outer housing 10 and the first filter 4 and the fifth filter 4 and the outer housing 10, whereafter the contaminated fluid will flow through the number of riser holes 3 and tubular elements 15 and rise upwards within the filter assembly in order to be distributed to the filters 4 through the separation voids 2a and 2b when the filter assembly rotates at high speed. Centrifugal forces will then separate dissolved contamination of different weight.

The contaminated fluid will thereafter be forced to flow through the filters 4 in order to be cleaned. The filtered or clean fluid will thereafter flow through the annular spaces 5a in order to be collected in the outer annular space 5b and further through outlet 12.

The arrows show how the contaminated fluid from a separation void 2a is guided to a filter 4, and how the filtered or clean fluid thereafter flow through the annular spaces 5a in order to be collected in the outer annular space 5b and further through the outlet 12.

The magnitude of such rotating force given by $F_c$+F, will effectively direct and force heavy particles to the outer dead end 13 of the annular compartment 5a, whereas the lighter content will be forced to the inner dead end 14 provided around the shaft 8, where subject disposals will be compacted and caked.

The majority of the contaminated fluid will be forced to the outer and inner dead ends 13, 14 of the annular space 5b and the shaft 8, which also represents the highest loaded filtration area.

FIG. 13 shows a similar embodiment as shown in FIG. 12, where the only difference is that the mesh filters 4 in this embodiment are provided with meshes on the upper side 17a the lower side 17b of the filter 4.

The bi-directional filter F comprises an annular outer housing 10, in which annular outer housing 10 an annular lower disc 1 and an annular upper disc 6 are arranged. The outer housing 10 is provided with one inlet 11 for contaminated fluid and an outlet 12 for filtered fluid.

Although the outer housing 10 is shown with only one inlet 11 for contaminated fluid and one outlet 12 for filtered fluid, it should be understood that the outer housing 10 could be provided with more than one inlet 11 for contaminated fluid and/or more than one outlet 12 for filtered fluid.

The lower disc 1 is also provided with a number of riser holes 3 that allows contaminated fluid to flow through the lower disc 1 and into the separation void 2a. The riser holes 3 are situated at a preselected radial distance from the rotational axis as appropriate to divide particles and phases in accordance to their densities.

Five filters 4 with a double-sided mesh 17a, 17b are arranged within the annular outer housing 10, where the filters 4 are arranged at a distance between each other, in order to provide a space 5a between two adjacent filters 4. The space 5a provided between two single sided adjacent mesh filters 4 is/are used to transport filtered fluid to an annular ring room 5b provided within the outer housing 10 and the outlet 12.

The stacked filters 4, lower disc 1, annular spaces 5a (clean fluid voids), annular space 5b and annular spaces 2a, 2b (separation voids) will form a filter assembly unit in the bi-directional filter F.

In one embodiment the filter assembly unit may be arranged in a container (not shown) or cartridge located within the outer housing 10.

The outer housing 10 may be provided with an opening mechanism (not shown) to allow an access to the container or cartridge inside the outer housing 10, such that the filter assembly unit/container or cartridge, manually or automatically, could be removed and replaced entirely, the rejected assembly being ready for return recycling shipment.

When the bi-directional filter F is assembled, the annular space 5b, which is delimited by an inner circumference of the outer housing 10 and an outer circumference of the mesh filters 4, will form an outer dead end 13 near the outer housing 10, while the annular spaces 5a provided between the filters 4 will form an inner dead end 14 around the shaft 8.

Each double-sided filter 4 is provided with a number of riser holes 3 and risers 15, thereby allowing the contaminated fluid to be distributed between the mesh filters 4.

The outer housing 10 and the filters 4 are provided with a central throughgoing hole, such that a shaft 8 can be inserted into the outer housing 10 and through the filters 4. The filters 4 are connected to the shaft 8 in appropriate ways. The shaft 8 is connected to a drive unit 9, where the drive unit 9 may be an electric motor or the like.

It could also be envisaged that horizontal and/or vertical acting magnetic interacting fields could be used to rotate the free fluid content within the filter assembly unit.

The contaminated fluid from inlet 11 will be guided into the space 2a provided between the outer housing 10 and the first filter 4 and the fifth filter 4 and the outer housing 10, whereafter the contaminated fluid will flow through the number of riser holes 3 and tubular elements 15 and rise upwards within the filter assembly in order to be distributed to the filters 4 through the separation voids 2a and 2b when the filter assembly rotates at high speed. Centrifugal forces will then separate dissolved contamination of different weight.

The contaminated fluid will thereafter be forced to flow through the filters 4 in order to be cleaned. The filtered or clean fluid will thereafter flow through the annular spaces 5a in order to be collected in the outer annular space 5b and further through outlet 12.

The arrows show that the contaminated fluid from a separation void 2a may be filtered through a filter 4 arranged above the separation void 2*a*, through a filter 4 arranged below the separation void 2*a*, or through both the upper and lower filters 4.

The magnitude of such rotating force given by $F_c + F$, will effectively direct and force heavy particles to the outer dead end 13 of the separation voids 2*a*, 2*b*, whereas the lighter content will be forced to the inner dead end 14 provided around the shaft 8, where subject disposals will be compacted and caked.

The majority of the contaminated fluid will be forced to the outer and inner dead ends 13, 14 delimited by the annular space 5*b* and the shaft 8, which also represents the highest loaded filtration area.

The bi-directional filter F assemblies according to FIGS. 10 to 13 may comprise one or more membrane filters and/or mesh filters.

Membrane filters may be made from a wide range of synthetic materials, including cellulose acetate, cellulose nitrate (collodion), polyamide (nylon), polycarbonate, polypropylene, and polytetrafluoroethylene (Teflon), —where all may integrate magnetic or magnetizing elements.

Mesh filters may be made from metal, polymers or natural materials, where the mesh material is selected based on the requirements indicated by the filtration task and the ambient conditions.

The invention is now explained with several non-limiting exemplary embodiments.

A person of skill in the art will appreciate that a variety of variations and modifications can be carried out of the bi-directional filter as described within the scope of the invention as defined in the appended claims.

The invention claimed is:

1. A bi-directional filter comprising an outer housing and a filter assembly unit, the outer housing being provided with one inlet for contaminated fluid and at least one outlet for filtered fluid, wherein the filter assembly unit comprises at least one separation void for contaminated fluid, the filter assembly unit being connected to a drive unit through a shaft,
    wherein an outer dead end of the separation void is positioned concentrically around a periphery of the filter assembly unit and an inner dead end of the separation void is positioned concentrically around the shaft, and the outer dead end and the inner dead end are connected to the filter assembly unit via the at least one separation void forming compartments through which fluid passes within the bi-directional filter.

2. A bi-directional filter according to claim 1,
    wherein the filter assembly unit comprises a lower disc, an upper disc, and at least one filter.

3. A bi-directional filter according to claim 2,
    wherein the lower disc is provided with a plurality of risers comprising one or more riser inlet holes arranged at a distance from a center of the lower disc, wherein the lower disc comprises at least one of the one or more riser inlet holes.

4. A bi-directional filter according to claim 2,
    wherein the filter is provided with one or more riser inlet holes and risers between each of the one or more riser inlet holes arranged between the outer dead end and the inner dead end.

5. The bi-directional filter according to claim 2,
    wherein the lower and/or upper disc is/are made of steel or a magnetic material.

6. The bi-directional filter according to claim 2, wherein the at least one filter comprises a membrane filter and/or a mesh filter.

7. The bi-directional filter according to claim 6,
    wherein the at least one filter comprises a mesh filter which is a single-sided filter with a mesh area or a double-sided filter with mesh areas.

8. A bi-directional filter according to claim 1,
    wherein the filter assembly unit comprises a lower disc, an upper disc, and a plurality of filters, the lower disc, upper disc, and plurality of filters are arranged with spaces therebetween, the spaces being used to transport contaminated fluid from the inlet to the plurality of filters and to transport filtered fluid to the at least one outlet.

9. The bi-directional filter according to claim 1,
    wherein the drive unit is an electrical motor or configured to generate a horizontal and/or vertical rotating magnetic field.

10. The bi-directional filter according to claim 1,
    wherein the bi-directional filter comprises a coil to provide magnetic and electrostatic fields.

11. A fluid purification system comprising:
    a bi-directional filter comprising an outer housing and a filter assembly unit, the outer housing being provided with one inlet for contaminated fluid and at least one outlet for filtered fluid, wherein the filter assembly unit comprises at least one separation void for contaminated fluid, the filter assembly unit being connected to a drive unit through a shaft,
    wherein an outer dead end of the separation void is positioned concentrically around a periphery of the filter assembly unit and an inner dead end of the separation void is positioned concentrically around the shaft, and the outer dead end and the inner dead end are connected to the filter assembly unit via the at least one separation void forming compartments through which fluid passes within the bi-directional filter,
    wherein the filter assembly unit comprises a lower disc, an upper disc, and at least one filter, the lower disc and/or the upper disc comprising a magnetic material, and
    wherein a plurality of magnetic nanoparticles are introduced into the contaminated fluid upstream of the inlet of the bi-directional filter.

\* \* \* \* \*